(12) United States Patent
Yang

(10) Patent No.: US 7,291,041 B1
(45) Date of Patent: Nov. 6, 2007

(54) DUAL PURPOSE MINI-CHARGER

(75) Inventor: Fu-I Yang, Taoyuan (TW)

(73) Assignee: Samya Technology Co., Ltd., Taoyuan County (TW)

( * ) Notice: Subject to any disclaimer, the term of this patent is extended or adjusted under 35 U.S.C. 154(b) by 0 days.

(21) Appl. No.: 11/528,600

(22) Filed: Sep. 28, 2006

(51) Int. Cl.
*H02J 7/00* (2006.01)

(52) U.S. Cl. .................. 439/500; 320/107; 320/110

(58) Field of Classification Search .......... 439/500; 320/107–112
See application file for complete search history.

(56) References Cited

U.S. PATENT DOCUMENTS

| | | | | |
|---|---|---|---|---|
| 4,409,536 | A * | 10/1983 | Evjen | 320/110 |
| 6,626,703 | B2 * | 9/2003 | Hsin | 439/638 |
| 6,710,577 | B1 * | 3/2004 | Shum | 320/112 |
| 2006/0097692 | A1 * | 5/2006 | Chen et al. | 320/107 |

* cited by examiner

*Primary Examiner*—Neil Abrams
(74) *Attorney, Agent, or Firm*—Rosenberg, Klein & Lee

(57) ABSTRACT

A dual purpose mini-charger includes: a main charging body having a USB-plug at the front end thereof, the USB-plug being connected to a USB-socket for obtaining the direct current for the charging purpose; two charging grooves adapted to accommodate batteries, the left and right charging grooves being disposed at both sides of the main charging body in an axial direction with respect to the USB-plug; and a charging control circuit board having a front portion adapted to fix a plurality of connecting pins in place such that an electric connection is created, the charging control circuit board further having a rear portion to which two pieces of first terminals are electrically coupled, the first terminals each having a contact piece fitted to an indentation at the bottom end of the left and right charging grooves, a second terminal with the telescopic and conducting function being disposed at an end opposite to the first terminals, the external end projecting at the front end of the charging groove. In this way, a secondary battery charger is small and suitable for charging two types of secondary batteries.

7 Claims, 8 Drawing Sheets

DUAL PURPOSE MINI-CHARGER

BACKGROUND OF THE INVENTION

1. Field of the Invention

The invention relates to a Ni—MH (nickel-metal hydride) or NiCd (nickel-cadmium) secondary battery charger, and more particularly, to a charger with charging grooves at both sides thereof. Moreover, the charger is suitable for charging different types of batteries.

2. Description of the Related Art

With the popularity of portable electronic products like digital cameras, MP3, PDA, etc., the demand for secondary batteries is considerably raised. The problem of the electronic products using the secondary batteries lies in the inconvenience of access to the power source when the user going out for a business trip uses up the energy in the battery.

As shown in FIGS. 1A and 1B, a charger 10 includes a plug 11 at the bottom thereof. The plug 11 is adapted to insert into an AC mains. A charging electronic unit 12 is disposed within the charger 10. The charging electronic unit 12 includes a positive and a negative charging terminal 121, 122 projecting from the front and the rear wall of a charging groove 13 for charging the secondary batteries 20.

However, the conventional charger 10 is connected to an AC mains socket (not shown) with the aid of the plug 11. As a result, the charger 10 requires an AC-DC-converter 14 for providing the charging electronic unit 12 with the required DC voltage. In this way, the AC-DC-converter 14 will occupy most of the space at the front half part of the charger 10. Besides, the charging electronic unit 12 is fitted to the bottom of the charging groove 13 so that it is difficult to reduce the volume of the whole structure of the charger 10, thereby causing inconvenience in carrying it outdoors. Moreover, the plug 11 requires a corresponding AC mains socket to provide the charging power. It is also a problem that the AC mains socket is usually unavailable outdoors.

As shown in FIG. 2, a conventional USB charger 30 includes a main body 31. A connection cord 32 and a USB plug 33 are extended from the main body 31. The USB plug 33 can be plugged into an electronic product 34 (such as notebook computer) with USB socket 35 when the user is outdoors. In this way, the secondary batteries 20 in the main body 31 can be charged without problem. In comparison to the AC charger 10 according to FIGS. 1A and 1B, the USB charger 30 has the advantage of directly obtaining DC power. However, the internal arrangement of the USB charger 30 is much the same to that of the AC charger 10 only with the difference that the connection cord 32 and the USB plug 33 are employed in the USB charger 30. As a result, this kind of the USB charger 30 has also the problem of large volume. In addition, the use of the connection cord 32 is unfavorable for carrying. Thus, the use of the USB charger 30 is much restricted, too. Furthermore, the main body 31 can accommodate only one type of batteries (such as 3/AA or 4/AAA). In charging the secondary batteries of different types in one charger, the charging structure has to be changed. This will cause much inconvenience and occupy much space.

With the constant improvement of the portable electronic products, commodities like MP3 or PDA were made smaller and thinner. Moreover, many of them employ the secondary batteries (like 3/AA or 4/AAA) for providing the required power. Thus, the development of the charger for secondary batteries is toward the miniaturization and compactness. In addition, the charger that can charge different types of secondary batteries (like 3/AA or 4/AAA) can meet the requirements of the market. This is the main goal that the invention tries to achieve.

SUMMARY OF THE INVENTION

It is a primary object of the invention to provide a dual purpose mini-charger in which the opening of the charging groove is formed at both sides thereof, thereby ensuring an excellent room utilization. Meanwhile, the volume of the charger can be reduced to a thin elongated shape. Furthermore, the charger is suitable for charging different secondary batteries. Thus, the charger is easy to carry and meets the requirements of charging two secondary batteries.

It is another object of the invention to provide a dual purpose mini-charger that avoids a reverse charging process caused by a reverse placement of the secondary batteries in the charging groove, thereby achieving a better safety and prolonging the service life.

In order to achieve the above-mentioned objects, the dual purpose mini-charger in accordance with the invention includes:

a) a main charging body having a USB-plug at the front end thereof, the USB-plug being connected to a USB-socket for obtaining the direct current for the charging purpose;

b) two charging grooves adapted to accommodate batteries, the left and right charging grooves being disposed at both sides of the main charging body in an axial direction with respect to the USB-plug; and c) a charging control circuit board having a front portion adapted to fix a plurality of connecting pins in place such that an electric connection is created, the charging control circuit board further having a rear portion to which two pieces of first terminals are electrically coupled, the first terminals each having a contact piece fitted to an indentation at the bottom end of the left and right charging grooves, a second terminal with the telescopic and conducting function being disposed at an end opposite to the first terminals, the second terminal being electrically coupled to the charging control circuit board, the second terminal including:

i) an external sleeve with an opening at the front and the rear end thereof, a locking protrusion extending inwardly being formed at the rear end of the second terminal;

ii) an internal sleeve formed as a hollow body having an opening at the front end thereof, the internal sleeve being movably disposed within the external sleeve, the internal sleeve having a flange extending outwardly and corresponding to the locking protrusion, the rear end of the second terminal being extended to the front end of the left and right charging grooves;

iii) a spring installed within the internal sleeve; and iv) a cap fixed at a front end of the external sleeve.

BRIEF DESCRIPTION OF THE FIGURES

The accomplishment of this and other objects of the invention will become apparent from the following descriptions and its accompanying figures of which.

DETAILED DESCRIPTION OF THE PREFERRED EMBODIMENT

Figure 1A:
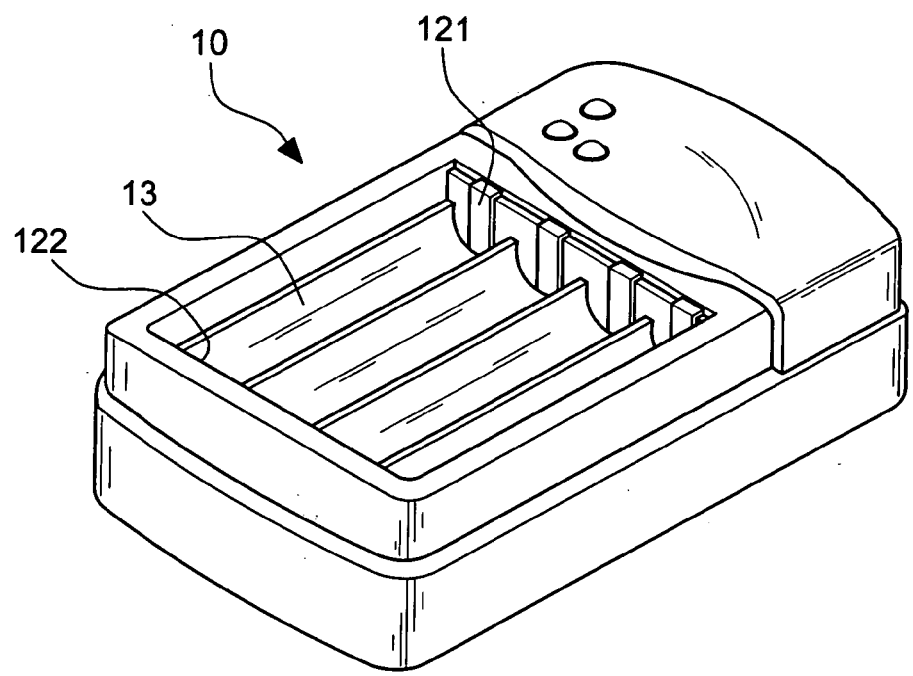
FIGS. 1A and 1B are a perspective view and a side view of a charger of the prior art.
Figure 1B:
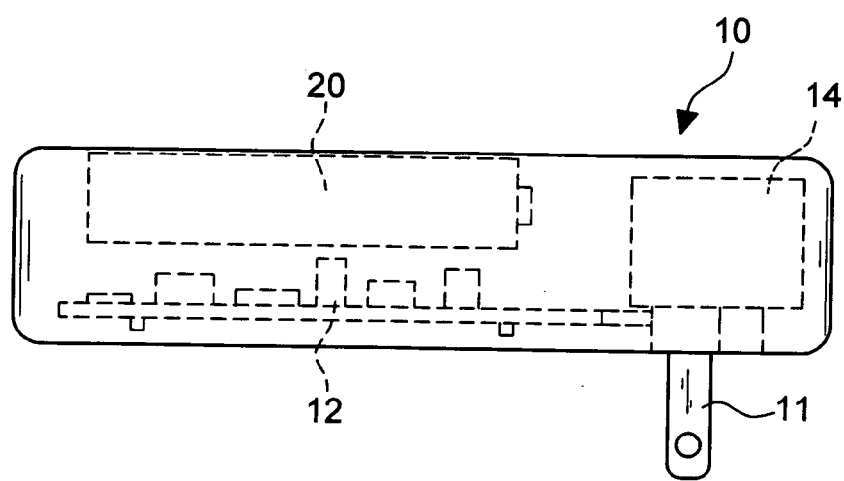
Figure 2:
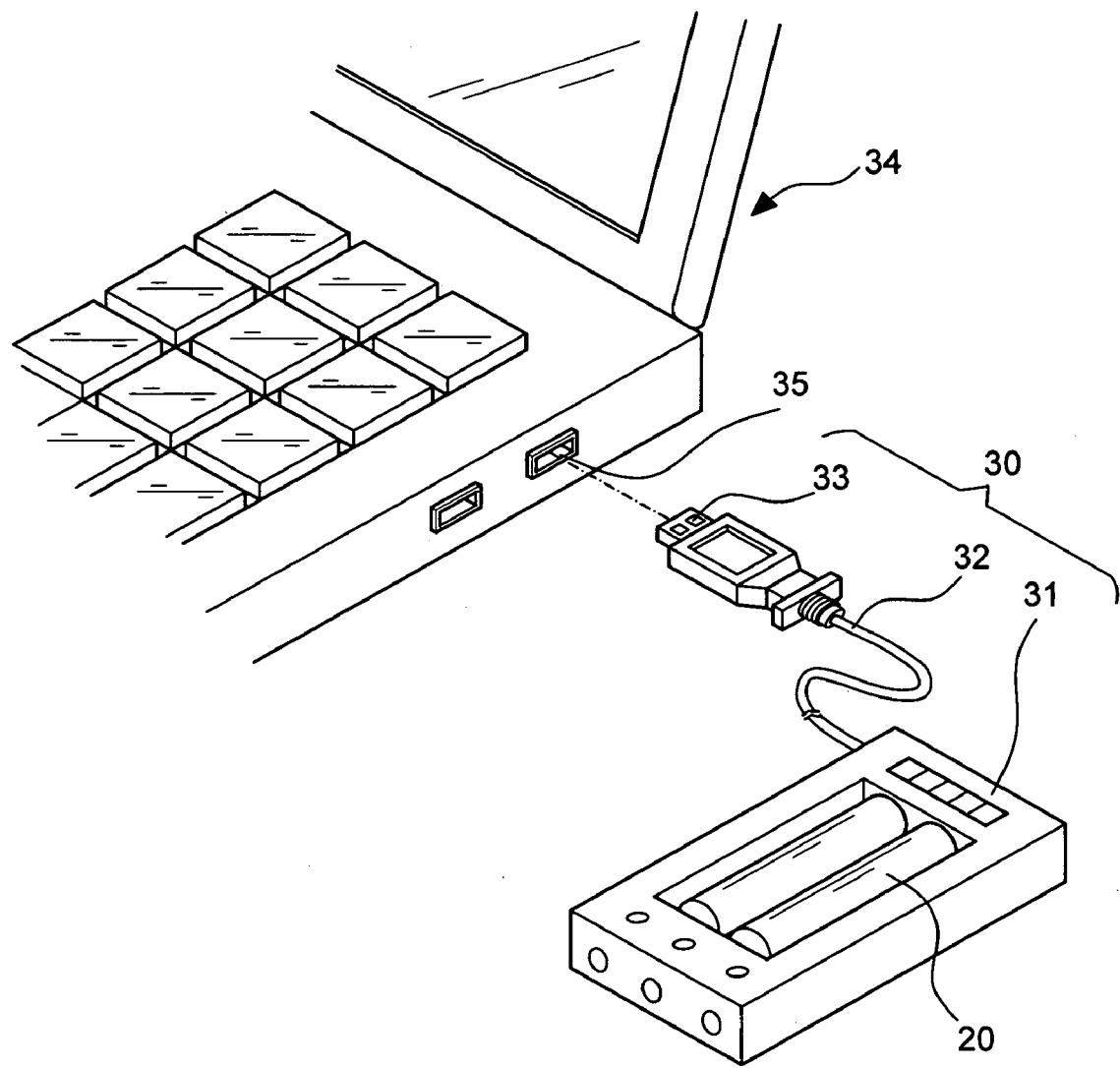
FIG. 2 is a perspective view of another charger of the prior art.
Figure 3:
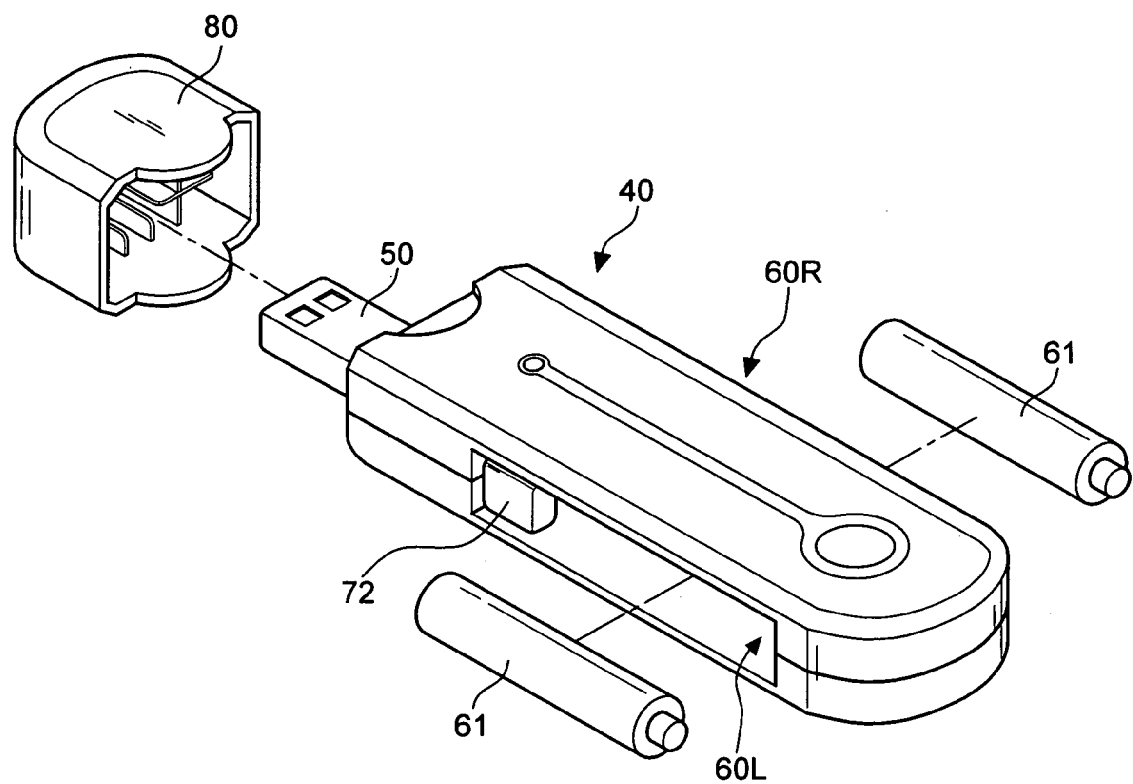
FIG. 3 is a perspective view of a preferred embodiment of the invention.
Figure 4:
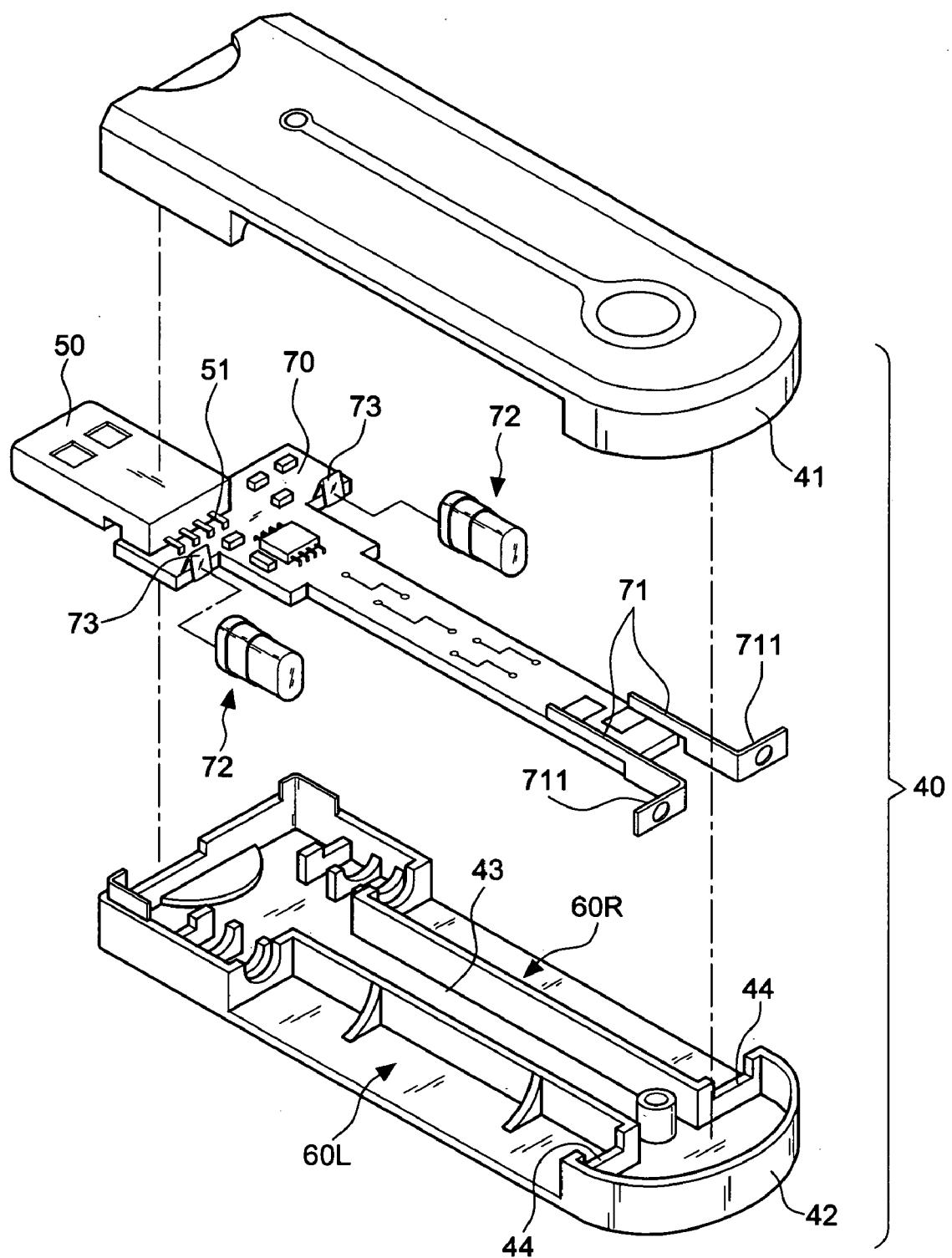
FIG. 4 is an exploded perspective view of the preferred embodiment of the invention.
Figure 5:
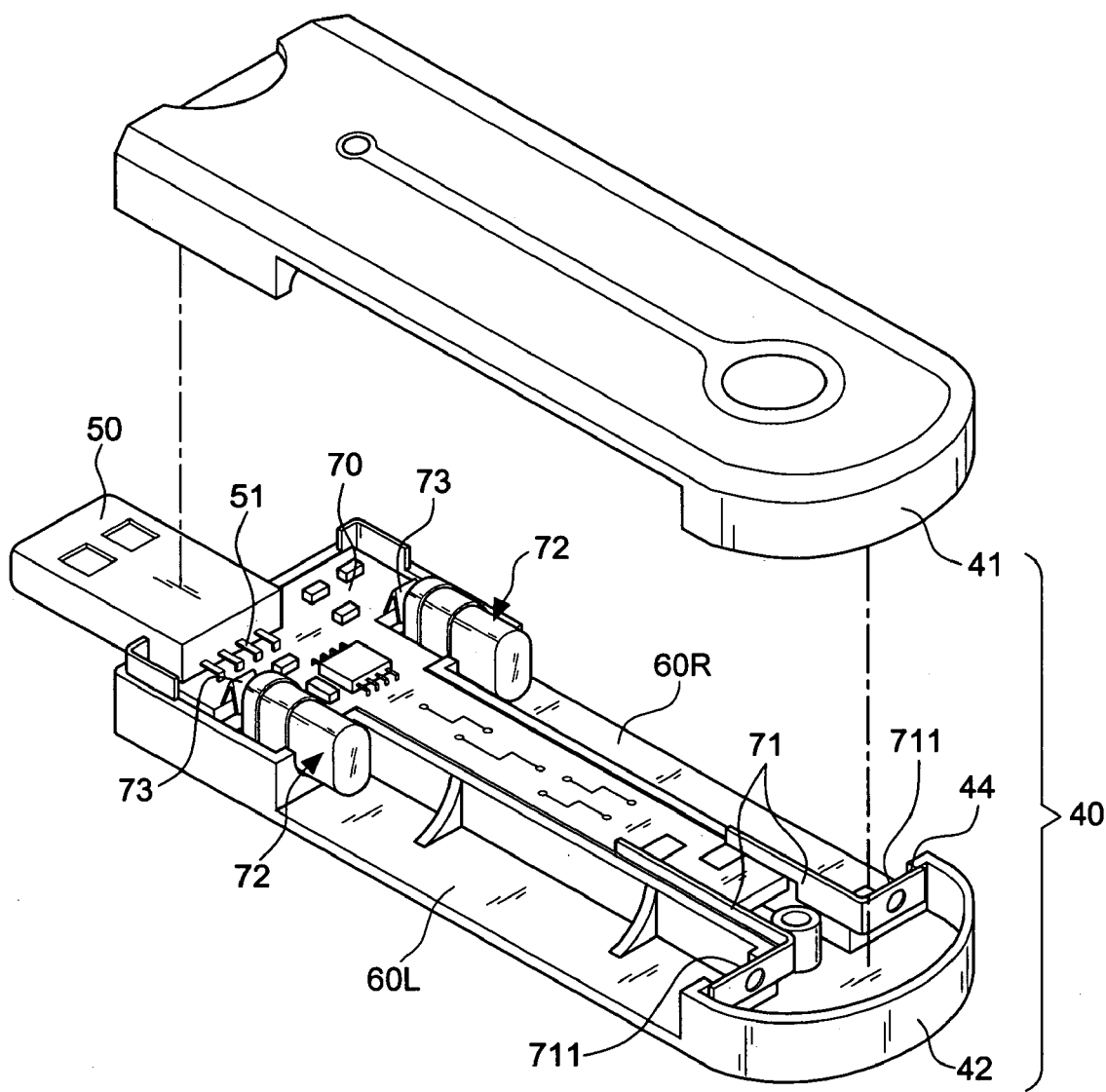
FIG. 5 is a perspective view of the preferred embodiment of the invention, showing that an upper and a lower housing are separated.

First of all, referring to FIGS. 3 through 5, a preferred embodiment of the invention includes a main charging body 40. The main charging body 40 has a USB-plug 50 at the front end thereof. The USB-plug 50 is connected to a USB-socket (not shown) for obtaining the direct current from the USB-socket. The main charging body 40 consists of an upper and a lower housing 41, 42 in which a receiving chamber 43 is formed for accommodating a charging control circuit board 70.

The main charging body 40 has a left and a right charging groove 60L, 60R at both sides thereof for the insertion of Ni—MH (nickel-metal hydride) or NiCd (nickel-cadmium) secondary batteries 61 for the charging purpose. Moreover, the left and right charging grooves 60L, 60R are disposed in an axial direction with respect to the USB-plug 50 in such a way that they are formed in a slim shape. Meanwhile, the opening is directed outwards for facilitating the removal and insertion of the secondary batteries 61. In addition, the USB-plug 50 further includes a protection cover 80. However, the structure thereof should not be restricted thereto.

Figure 6:
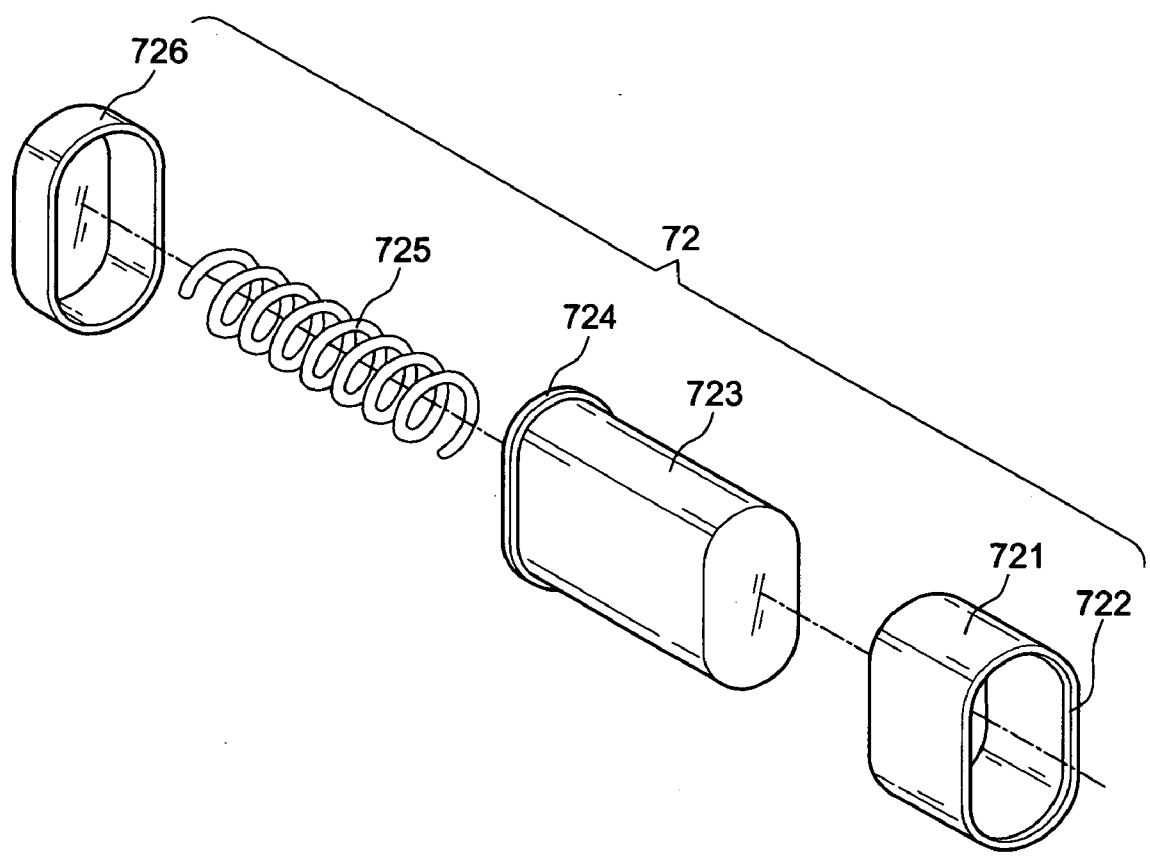
FIG. 6 is an exploded perspective view of a second terminal in accordance with the preferred embodiment of the invention.
Figure 7:
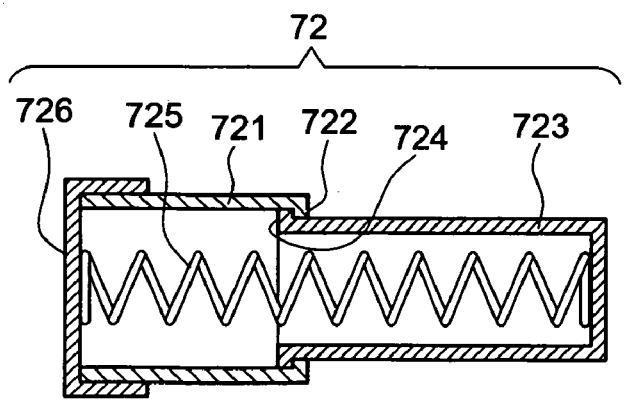
FIG. 7 is an axially sectional view of the second terminal in accordance with the preferred embodiment of the invention.

The invention stands out for the charging control circuit board 70 having a front portion adapted to fix a plurality of connecting pins 51 in place such that an electric connection is created. Meanwhile, the charging control circuit board 70 includes a rear portion to which two pieces of first terminals 71 are electrically coupled. Each of the first terminals 71 has a contact piece 711 attached to an indentation 44 at the bottom end of the left and right charging grooves 60L, 60R. In this way, an electric connection is established when the batteries are placed into the left and right charging grooves 60L, 60R. Moreover, a second terminal 72 having the telescopic and conducting function is disposed at an end opposite to the first terminals 71. Meanwhile, the second terminal 72 is electrically coupled to the charging control circuit board 70. As shown in FIGS. 6 and 7, the charging control circuit board 70 includes an external sleeve 721 with an opening at the front and the rear end thereof. A locking protrusion 722 extending inwardly is formed at the rear end of the second terminal 72. An internal sleeve 723 is a hollow body having an opening at the front end thereof. The internal sleeve 723 is movably disposed within the external sleeve 721. Besides, the internal sleeve 723 includes a flange 724 extending outwardly and corresponding to the locking protrusion 722. The rear end of the second terminal 72 is extended to the front end of the left and right charging grooves 60L, 60R. A spring 725 is installed within the internal sleeve 723. And a cap 726 is fixed at a front end of the external sleeve 721.

Figure 8:
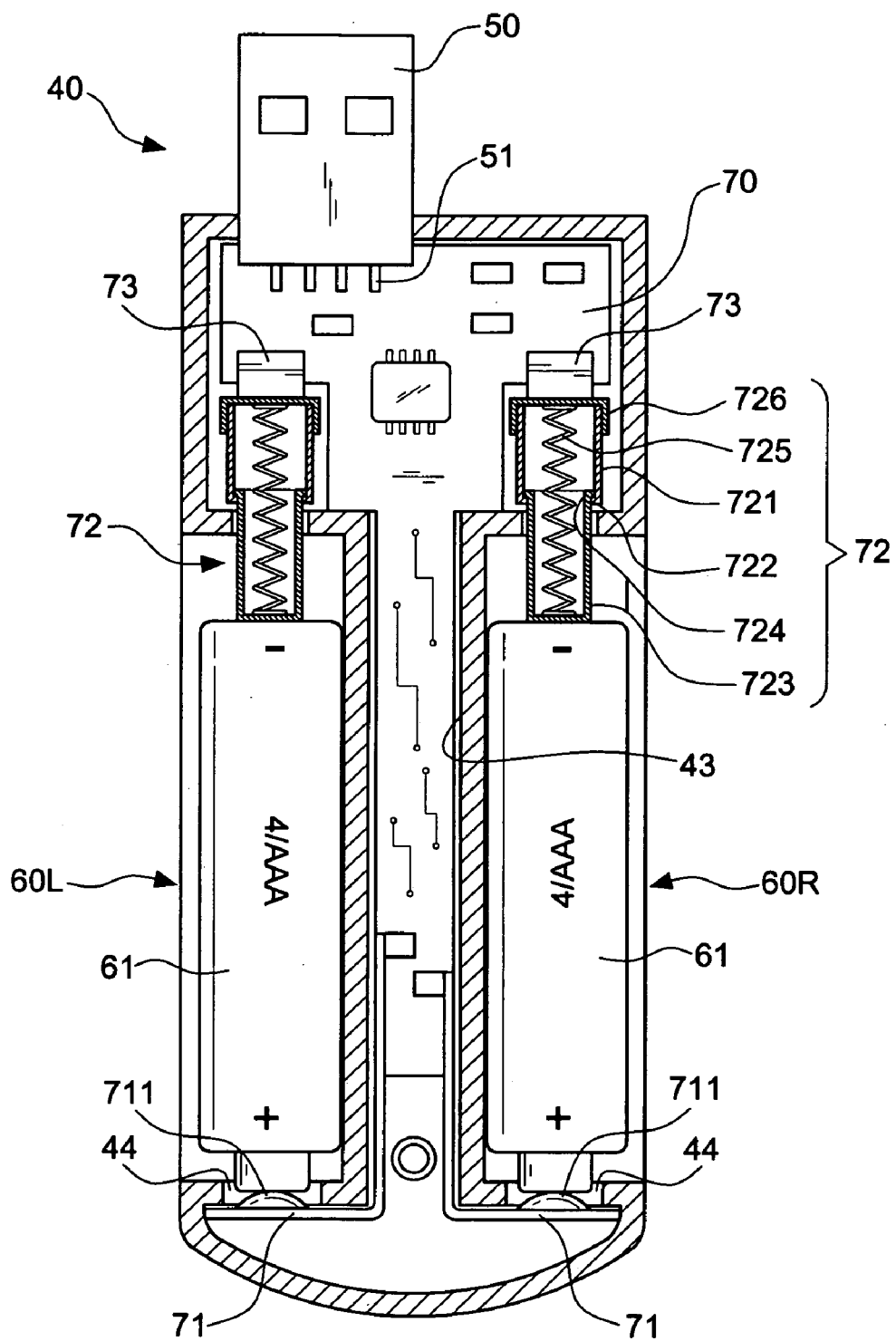
FIG. 8 is a schematic drawing of the invention in charging batteries with the type of 4/AAA.

Based on the above-mentioned configuration, the second terminal 72 in accordance with the invention has the telescopic function. The front end of the second terminal 72 is in contact of a conducting element 73 of the charging control circuit board 70 to establish an electric connection. The aforementioned conducting element 73 may be a metal spring piece, an electric wire, and the like. The rear end of the charging control circuit board 70 is extended to the front end of the left and right charging grooves 60L, 60R. As shown in FIG. 8, the secondary batteries 61 (type: 4/AAA, so-called No. 4) are placed into the charging grooves. The spring 725 within the second terminal 72 creates a compression force acting on the internal sleeve 723 in such a way that the rear end of the second terminal 72 is in contact of the negative terminal of the secondary battery 61. In this way, the positive terminal of the secondary battery 61 creates an electric connection to the contact piece 711 of the first terminal 71, thereby forming a charging loop. It is noted that the contact piece 711 of the first terminal 71 according to the preferred embodiment is installed in the indentation 44 at the rear end of the left and right charging grooves 60L, 60R. In other words, the electric connection is established only when the protrusion of the positive terminal of the secondary battery 61 engages into the indentation 44 to be in contact with the contact piece 711. Therefore, a conducting charging loop won't be established when the battery is placed in an inverse direction since the negative terminal of the battery is formed to be a flat surface that can't engage into the indentation 44. Accordingly, a reverse charging process can be avoided to ensure a better safety and prolong the service life.

Figure 9:
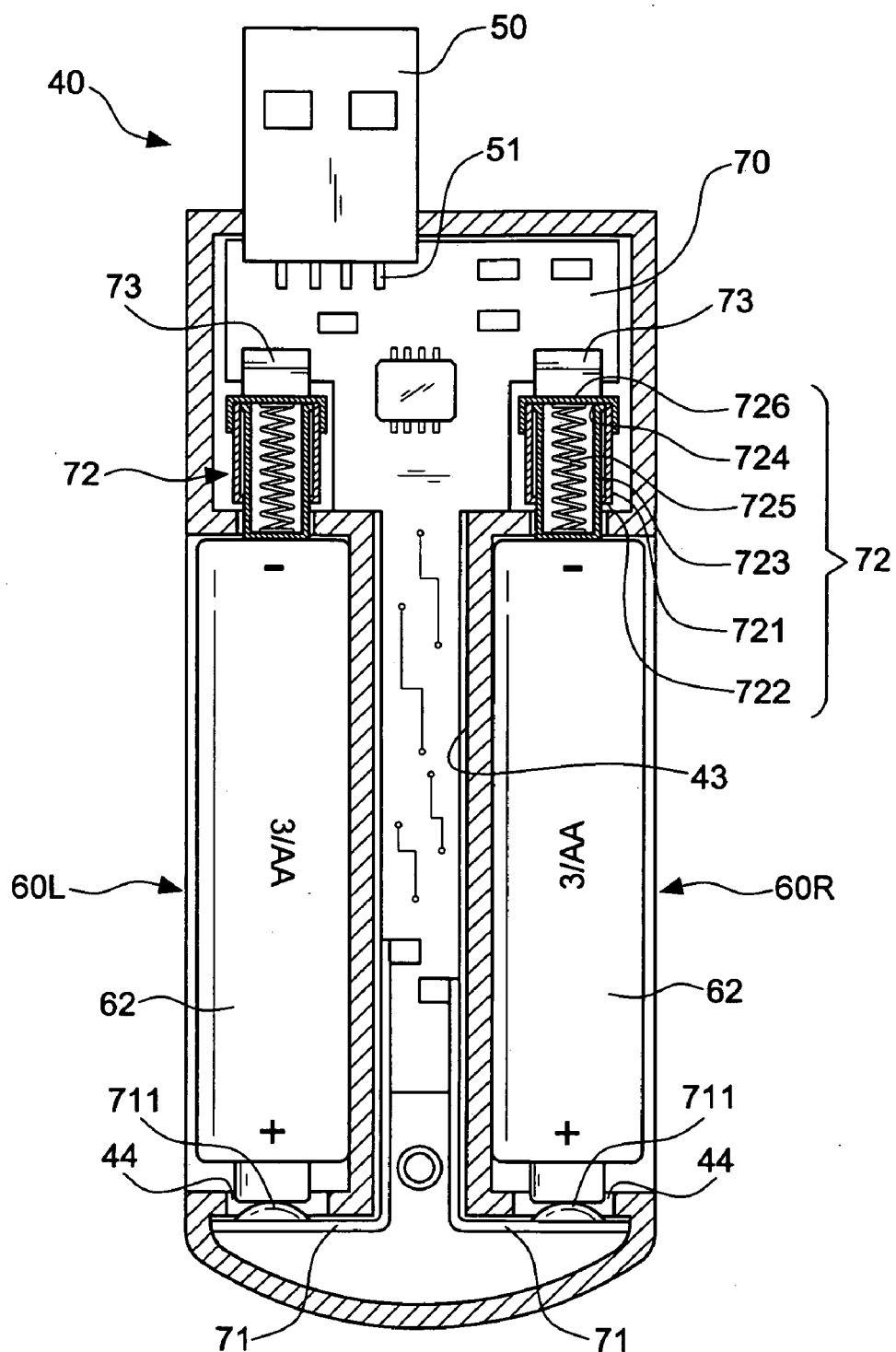
FIG. 9 is a schematic drawing of the invention in charging batteries with the type of 3/AA.

As shown in FIG. 9, the secondary batteries 62 have the type No. 3/AA and are so-called No. 3 battery. The No. 3 batteries are dimensioned larger than the No. 4 batteries. Therefore, the internal sleeve 723 of the second terminal 72 is retracted in such a way that the rear end of the internal sleeve 723 still lies against the negative terminal of the secondary batteries 62. Accordingly, the invention is suitable for charging the secondary batteries with the type of 3/AA and 4/AAA.

Referring now to FIGS. 7 through 9, the second terminal 72 always ensures a perfect electric contact no matter if the internal sleeve 723 is extended, as shown in FIG. 8 or extracted, as shown in FIG. 9. In other words, the flange 724 is always in electric contact of the internal wall of the external sleeve 721, thereby ensuring an electric connection to the cap 726. In addition, the internal sleeve 723 is always in electric contact to the cap 726 by means of the spring 725 within the internal sleeve 723. This configuration with double electric contact can avoid the problem of bad contact caused by the extending or retracting action of the second terminal 72. As a result, the second terminal 72 permits a perfect electric contact and ensures a reliable charging process no matter if the second terminal 72 is extended or retracted.

Based on the above-mentioned configuration with an axial arrangement, the opening of the charging groove is formed at both sides thereof, thereby ensuring an excellent room utilization. Accordingly, the volume of the charger can be reduced to a thin elongated shape. Thus, the charger in accordance with the invention is easy to carry and practical in connection to the electronic apparatuses with USB socket. Furthermore, the charger in accordance with the invention is suitable for charging different secondary batteries (such as 4/AAA and 3/AA batteries).

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A dual purpose mini-charger, comprising:
   a) a main charging body having a USB-plug at the front end thereof, the USB-plug being connected to a USB-socket for obtaining the direct current for the charging purpose;
   b) two charging grooves adapted to accommodate batteries, the left and right charging grooves being disposed at both sides of the main charging body in an axial direction with respect to the USB-plug; and
   c) a charging control circuit board having a front portion adapted to fix a plurality of connecting pins in place such that an electric connection is created, the charging control circuit board further having a rear portion to which two pieces of first terminals are electrically coupled, the first terminals each having a contact piece fitted to an indentation at the bottom end of the left and right charging grooves, a second terminal being disposed at an end opposite to the first terminals, the second terminal being electrically coupled to the charging control circuit board, the second terminal being extendable and retractable such that the charging grooves can accommodate the second batteries with the type of 3/AA and 4/AAA for the charging process.

2. The dual purpose mini-charger as recited in claim 1 wherein the contact piece of the first terminal is installed in the indentation at the rear end of the charging grooves for ensuring an electric contact when the projecting positive terminal of the battery engages into the indentation.

3. The dual purpose mini-charger as recited in claim 1 wherein the second terminal includes:
   a) an external sleeve with an opening at the front and rear end thereof, a locking protrusion extending inwardly being formed at the rear end of the second terminal;
   b) an internal sleeve formed as a hollow body having an opening at the front end thereof, the internal sleeve being movably disposed within the external sleeve, the internal sleeve having a flange extending outwardly and corresponding to the locking protrusion, the rear end of the second terminal being extended to the front end of the left and right charging grooves;
   c) a spring installed within the internal sleeve; and
   d) a cap fixed at a front end of the external sleeve.

4. The dual purpose mini-charger as recited in claim 1 wherein the main charging body consists of an upper and a lower housing in which a receiving chamber is formed for accommodating a charging control circuit board.

5. The dual purpose mini-charger as recited in claim 1 wherein the first terminal is directly and electrically connected to the charging control circuit board while the second terminal is coupled to the charging control circuit board via a conducting element for establishing the electric connection.

6. The dual purpose mini-charger as recited in claim 1 wherein the USB-plug further includes a protection cover.

7. A dual purpose mini-charger, comprising:
   a) a main charging body having a USB-plug at the front end thereof, the USB-plug being connected to a USB-socket for obtaining the direct current for the charging purpose;
   b) two charging grooves adapted to accommodate batteries, the left and right charging grooves being disposed at both sides of the main charging body in an axial direction with respect to the USB-plug; and
   c) a charging control circuit board having a front portion adapted to fix a plurality of connecting pins in place such that an electric connection is created, the charging control circuit board further having a rear portion to which two pieces of first terminals are electrically coupled, the first terminals each having a contact piece fitted to an indentation at the bottom end of the left and right charging grooves, a second terminal with the telescopic and conducting function being disposed at an end opposite to the first terminals, the second terminal being electrically coupled to the charging control circuit board, the second terminal including:
      i) an external sleeve with an opening at the front and the rear end thereof, a locking protrusion extending inwardly being formed at the rear end of the second terminal;
      ii) an internal sleeve formed as a hollow body having an opening at the front end thereof, the internal sleeve being movably disposed within the external sleeve, the internal sleeve having a flange extending outwardly and corresponding to the locking protrusion, the rear end of the second terminal being extended to the front end of the left and right charging grooves;
      iii) a spring installed within the internal sleeve; and
      iv) a cap fixed at a front end of the external sleeve.

* * * * *